July 9, 1946.  F. H. BOOR  2,403,492
GEARS
Filed April 14, 1944
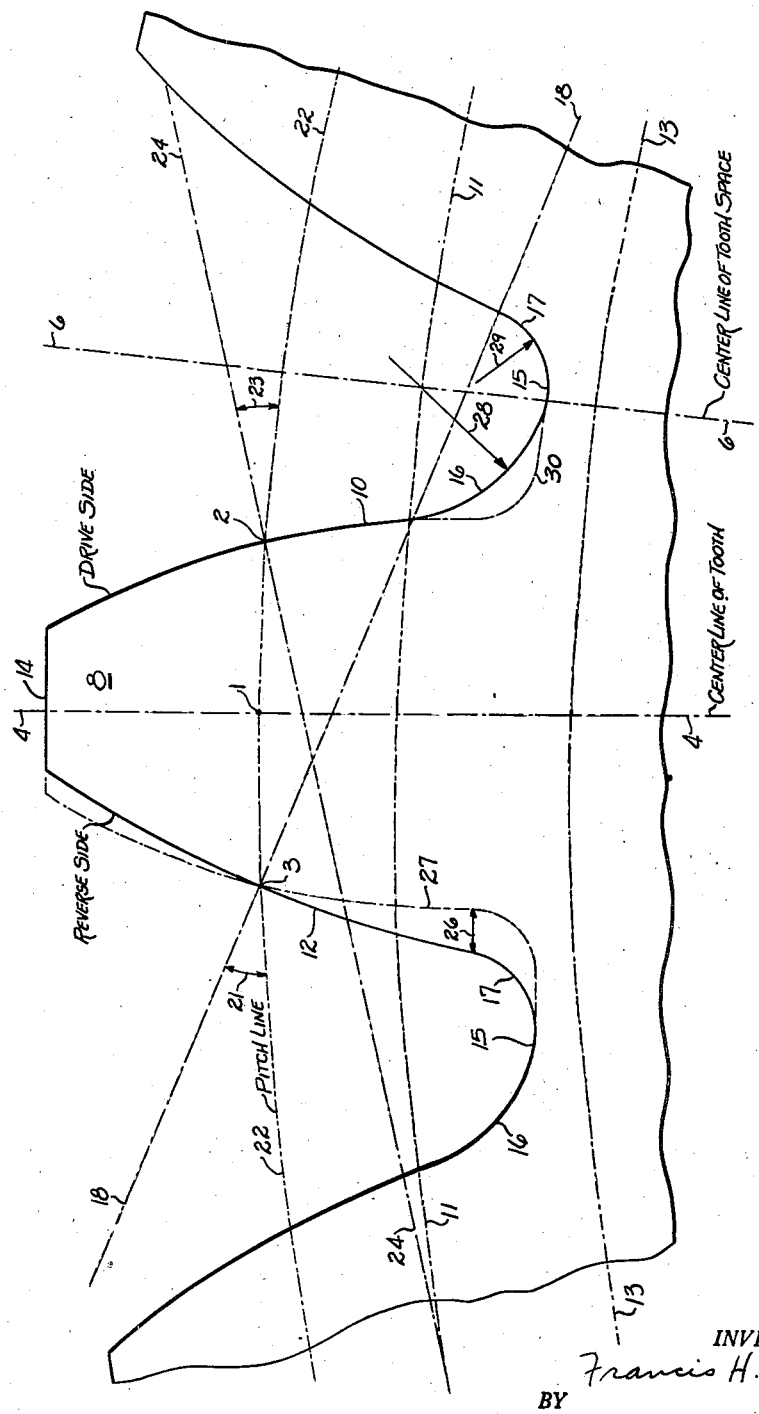
INVENTOR.
Francis H. Boor
BY
Woodling and Krost.
attys.

Patented July 9, 1946

2,403,492

UNITED STATES PATENT OFFICE 2,403,492

GEAR

Francis H. Boor, Lafayette, Ind., assignor to Fairfield Manufacturing Company

Application April 14, 1944, Serial No. 530,997

5 Claims. (Cl. 74—462)

My invention relates in general to gear wheels and more particularly to gear wheels adapted to rotate primarily in one direction.

With gears that rotate primarily in only one direction, important advantages over conventional involute design in teeth are obtained by my invention.

An object of my invention is to increase the base tooth thickness of gear teeth without decreasing the total number of teeth on a given gear.

Another object of my invention is to increase the number of teeth on a given gear and still retain a wide tooth base.

Another object of my invention is to decrease the stress per tooth on a gear having a given number of teeth.

Another object of my invention is to increase the tooth contact ratio for a gear without decreasing the base tooth thickness.

Another object of my invention is to reduce the stress concentration in the fillet of the tooth on the active, or drive side of the tooth.

Other objects and a fuller understanding of my invention may be had by referring to the following description and claims, taken in conjunction with the accompanying drawing, in which the single figure of the drawing represents a fragmentary view of a gear embodying the features of my invention.

With reference to the drawing, I illustrate a fragmentary portion of a gear having a plurality of teeth. The teeth are all alike and the description will deal with the tooth 8. The tooth 8, developed in accordance with my invention has two involute curved surfaces, one of the surfaces being designated by reference character 10 generated from a base circle 11, and the other of the surface is designated by reference character 12 and is generated from a base circle 13. The tooth also has a top land surface 14 and is separated from adjacent teeth by a bottom land surface 15 which is composed of two curved fillet portions 16 and 17 having different radii. The tooth face 10 blends with the bottom land surface 15 which is between adjacent teeth, through the fillet portion 16 at the base of surface 10 and the tooth face 12 blends with the bottom land surface 15 through the fillet portion 17 at the base of surface 12. Point 1 is the center of the tooth, as the distance from 1 to 3 equals the distance from 1 to 2. Line 4 represents the tooth center line.

In certain designs, gears in a given device rotate in only one direction and therefore, have active contact on only one side of any given tooth. In my invention the gear teeth for gear wheels adapted to rotate primarily in one direction are designed whereby a standard involute surface is maintained on the drive or load carrying side of a given tooth, but have a backing or reverse side with a more sloping surface. Such a design provides a tooth base of greater width, and therefore, greater strength, than a standard involute tooth, or conversely, a greater number of teeth per gear for a given tooth base thickness, thereby providing a greater contact ratio between mating gears. Also in my invention the large fillet 16 on the drive side of the tooth and a small fillet 17 on the reverse side, results in a stronger tooth.

In the drawing, the surface 10 is a standard involute surface defined from the base circle 11. A base circle is the circle from which the involute in the plane of rotation is generated.

The surface 12 is the surface of the tooth 8 not carrying an active load. The surface 12 is an involute curve and is defined from a base circle 13 which is of a smaller diameter than base circle 11. The dot-dash line 27 indicates the position of a standard involute tooth as defined by common practice, the common practice being to define both surfaces of a tooth from a common base circle with the tooth being symmetrical about the tooth center line 4. Thus, the increase of tooth base thickness brought about by my invention is indicated by the distance 26 between the dot-dash line 27 and the involute surface 12. The increase 26 of the base tooth thickness provides teeth which are stronger than standard involute gear teeth without reducing the total number of teeth on a given gear.

The surface 12 is disposed to contact a similarly defined mating surface of a meshing gear tooth, and I illustrate a line of action 18 passing through the pitch point 3.

The line of action 18 and the pitch line 22 intersect each other, the point of intersection being at the pitch point 3, and form an included angle 21 therebetween. The line of action 24 and the pitch line 22 intersect each other, the point of intersection being at the pitch point 2, and form an included angle 23 therebetween. The pitch line 22 is disposed to intersect the tooth 8 at pitch points 2 and 3. A radial line 4 of the tooth 8 intersects the pitch line 22 at a point 1 which is at the center of the tooth along the pitch line 22 inasmuch as the distance from the point 1 to the point 2 along he pitch line 22 is equal to the distance from the point 1 to the point 3 along the pitch line 22. It is noted from the drawing, however, that the tooth is unsymmetrical about the radial line 4. If the tooth were symmetrical, lines 18 and 24 would intersect on center line 4. The angle 23 is smaller than the angle 21. The effect of having angle 23 smaller than angle 21 is to provide a larger contact ratio between the driving faces of the meshing gear teeth, resulting in quiet operation, with a wide tooth base. In accordance with accepted terminology, the portion of the tooth surfaces above the pitch line 22 may be referred to as the "face," and the portion below the line 22 as the "flank."

Tooth failure is often caused by a concentration of stress at the base of the tooth on the drive side in the fillet area 16 of the bottom land 15. With teeth developed according to my invention, a longer radius 28 is used to define fillet portion 16 than is used in standard practice. The fillet portion 17 is defined by a radius 29 of standard or minimum length. The larger fillet 16 resulting from the use of a long radius 28 increases the strength of the teeth. The broken line 30 represents the standard or conventional shaped fillet, that is, line 30 would have the same radius as line 17, and the bottom land 15 would be symmetrical about a tooth space center line 6. In my invention radius 28 is larger than is possible to have when the tooth space is symmetrical.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A gear wheel having a plurality of teeth, each of said teeth being unsymmetrical and having sides describing involute profiles defined from base circles, one of said sides being defined from a base circle of smaller diameter than the other, the side defined from the base circle of smaller diameter, when in contact with a similar side of a tooth of another gear, having a line of action inclined at a greater angle to a pitch line of the gears than the line of action of the side of said tooth defined from the larger of said base circles, said sides of adjacent teeth being separated by a bottom land portion, said bottom land portion being unsymmetrical with respect to a radial line of the gear, portions of said bottom land being defined from different radius centers, and the longer of the radii defining the profile line of the bottom land area adjacent to the side of said tooth having the larger of said lines of action.

2. A gear wheel having a plurality of gear teeth, each of said gear teeth having a curved drive side surface including a face portion and a flank portion, and a curved reverse side surface including a face portion and a flank portion, at least said flank portion of the drive side surface having a profile which defines an involute curve developed from a base circle, and at least said flank portion of the reverse side surface having a profile which defines an involute curve developed from a base circle, the base circle for said drive side surface being of a larger diameter than the said circle for said reverse side surface.

3. A gear wheel having a plurality of gear teeth, each of said gear teeth having a curved drive side surface including a face portion and a flank portion, and a curved reverse side surface including a face portion and a flank portion, at least said flank portion of the drive side surface having a profile which defines an involute curve developed from a base circle, and at least said flank portion of the reverse side surface having a profile which defines an involute curve developed from a base circle, the base circle for said drive side surface being of a larger diameter than the base circle for said reverse side surface, said drive side surface of each tooth being adjacent to the reverse side of a neighboring tooth, said drive side surface and reverse side surface of the neighboring teeth being joined in a bottom land area, said bottom land area having a first surface portion and a second surface portion, said first surface portion having a radius, said second surface portion having a radius, said first portion radius being longer than the said second portion radius, and said first surface portion being joined to the profile of the said flank portion of the drive side surface and the said second surface portion being joined to the profile of the said shank portion of the reverse side surface of the neighboring tooth.

4. A gear wheel having a plurality of gear teeth, each of said gear teeth having a curved drive side surface including a face portion and a flank portion, and a curved reverse side surface including a face portion and a flank portion, at least said flank portion of the drive side surface having a profile which defines an involute curve, and at least said flank portion of the reverse side surface having a profile which defines an involute curve, said drive side surface of each tooth being adjacent to the reverse side of a neighboring tooth, said drive side surface and reverse side surface of the neighboring teeth being joined in a bottom land area, said bottom land area having a first surface portion and a second surface portion, said first surface portion having a radius, said second surface portion having a radius, said first portion radius being longer than the said second portion radius, and said first surface portion being joined ot the profile of the said flank portion of the drive side surface and the said second surface portion being joined to the profile of the said shank portion of the reverse side surface of the neighboring tooth.

5. A gear wheel having a plurality of gear teeth, each of said gear teeth having a curved drive side surface including a face portion and a flank portion, and a curved reverse side surface including a face portion and a flank portion, said face and flank portion of the drive side surface comprising a continuous involute surface having a profile which defines an involute curve developed from a base circle, and said face and flank portion of the reverse side surface comprising a continuous surface having a profile which defines an involute curve developed from a base circle, the base circle of said drive side surface being of a larger diameter than the base circle for said reverse side surface.

FRANCIS H. BOOR.